United States Patent
Wei et al.

(10) Patent No.: US 6,627,054 B2
(45) Date of Patent: Sep. 30, 2003

(54) ELECTRODE FOR ELECTROCHEMICAL MACHINING

(75) Inventors: Bin Wei, Mechanicville, NY (US); R. Grant Rowe, Niskayuna, NY (US); Bruce A. Knudsen, Amsterdam, NY (US); Hao Yu, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/767,626

(22) Filed: Jan. 23, 2001

(65) Prior Publication Data

US 2003/0006137 A1 Jan. 9, 2003

(51) Int. Cl.[7] .................. C25B 11/00; C25D 17/00; B23H 3/04
(52) U.S. Cl. ............. 204/280; 204/224 M; 204/290.01
(58) Field of Search ................ 204/224 M, 280, 204/284, 290.01; 219/69.15; 205/665

(56) References Cited

U.S. PATENT DOCUMENTS

| | | | | |
|---|---|---|---|---|
| 3,257,717 A | * | 6/1966 | Wilkinson et al. | 204/224 M |
| 3,436,331 A | * | 4/1969 | Dietz et al. | 204/224 M |
| 3,489,671 A | * | 1/1970 | Stark et al. | 204/224 M |
| 3,990,959 A | * | 11/1976 | Payne et al. | 204/224 M |
| 4,085,025 A | * | 4/1978 | Lekarev et al. | 204/224 M |
| 4,387,014 A | * | 6/1983 | Stengel | 204/212 |
| 4,622,449 A | * | 11/1986 | Inoue | 204/224 M |
| 4,988,424 A | * | 1/1991 | Woodward et al. | 118/504 |
| 5,045,161 A | * | 9/1991 | McGregor | 204/212 |
| 5,685,971 A | | 11/1997 | Schroder et al. | |

FOREIGN PATENT DOCUMENTS

JP  1-295720  * 11/1989

* cited by examiner

*Primary Examiner*—Patrick Ryan
*Assistant Examiner*—Thomas H. Parsons
(74) *Attorney, Agent, or Firm*—Pierce Atwood

(57) ABSTRACT

Non-circular holes are formed by electrochemical machining with an electrode that includes a hollow shank having a circular cross-section and a hollow tip section having a non-circular cross-section disposed on one end of the shank. The tip section is very small in length relative to the shank such that the shank comprises a large majority of the electrode's overall length. Because the majority of the electrode is circular in cross-section, it is relatively easy to straighten the electrode prior to a machining operation and to keep it straight during the operation, thereby overcoming problems experienced with full-length, non-circular electrodes. The circular shank also avoids electrolyte pressure imbalances and eases the difficulty and high cost of manufacturing electrodes capable of forming non-circular holes.

13 Claims, 2 Drawing Sheets

ELECTRODE FOR ELECTROCHEMICAL MACHINING

BACKGROUND OF THE INVENTION

1. Field of the Invention

This invention relates generally to electrochemical machining and more particularly to shaped electrodes useful in an electrochemical process known as Shaped Tube Electrochemical Machining.

2. Description of the Related art

Gas turbine engines are used for a wide variety of aeronautical, marine and industrial applications. Generally, a gas turbine engine includes a compressor that provides pressurized air to a combustor wherein the air is mixed with fuel and the mixture is ignited for generating hot combustion gases. These gases flow downstream to a turbine section that extracts energy therefrom to drive the compressor and provide useful work. It is well known to increase the efficiency of gas turbine engines by increasing the turbine operating temperature. As operating temperatures are increased, the thermal limits of certain engine components may be exceeded, resulting in material failure or, at the very least, reduced service life. In addition, the increased thermal expansion and contraction of these components adversely effects clearances and their interfitting relationships with other components having different thermal coefficients of expansion. Consequently, these components are cooled to avoid potentially damaging consequences at elevated operating temperatures.

It is common practice to extract a portion of the compressor discharge air for such cooling purposes. Turbine components disposed in the hot gas path typically employ internal cooling to keep the component temperatures within certain design limits. Internal cooling of turbine components usually involves a number of long, small diameter holes formed in the component walls. One common approach to forming these cooling holes is an electrochemical process known in the industry as the Shaped Tube Electrochemical Machining (STEM) drilling process.

The STEM drilling process is a variation of electrochemical machining (ECM) that involves providing a tube or hollow electrode through which an electrolyte, such as sulfuric or nitric acid, is pumped under a predetermined pressure onto a surface area of a conductive workpiece where a hole is to be drilled. A direct current electrical potential is established between the electrode and the workpiece to cause controlled deplating of the electrically conductive workpiece when the electrolyte flows from the electrode onto the workpiece. The deplating action takes place in an electrolytic cell formed by the negatively charged electrode (cathode) and the positively charged workpiece (anode) separated by the flowing electrolyte. Traditionally, STEM drilling of turbine components involved using round or circular electrodes to bore the cooling holes as straight cylindrical apertures.

In the continuing effort to improve the thermodynamic efficiency of gas turbine engines by further increasing gas inlet temperatures, the cooling efficiency of conventional circular holes is not always sufficient. This is particularly so in turbine rotor blades (sometimes referred to as buckets) where, given the constraints of the wall thickness at the blade trailing edge, it is extremely advantageous to use elliptic or oval shaped cooling holes to maximize the wall thickness while maintaining the required amount of coolant flow. Other non-circular geometries may also be useful. In such instances, tubular electrodes having the desired non-circular shape are substituted for conventional circular STEM electrodes. However, non-circular tube geometries typically develop higher internal stresses than circular tube geometries during manufacture thereof. These internal stresses tend to cause electrode bending, requiring the electrode to be straightened prior to a STEM drilling operation. It can be difficult to straighten full-length, non-circular electrodes prior to a STEM drilling operation and to keep such electrodes straight during the drilling process. Furthermore, non-circular electrodes may also experience pressure imbalances of the electrolyte flowing therethrough due to the non-axisymmetric nature of such electrodes. Such pressure imbalances can add to the difficulty of keeping electrodes straight during the drilling process. Non-circular STEM electrodes are also relatively expensive to manufacture.

Accordingly, it would be desirable to provide a STEM electrode that is capable of forming non-circular holes while avoiding the cost and straightening problems experienced with full-length, non-circular electrodes.

BRIEF SUMMARY OF THE INVENTION

The above-mentioned need is met by the present invention, which provides an electrode for use in an electrochemical machining apparatus. The electrode includes a hollow shank having a circular cross-section and a hollow tip section having a non-circular cross-section disposed on one end of the shank. The tip section is very small in length relative to the shank such that the shank comprises a large majority of the electrode's overall length.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
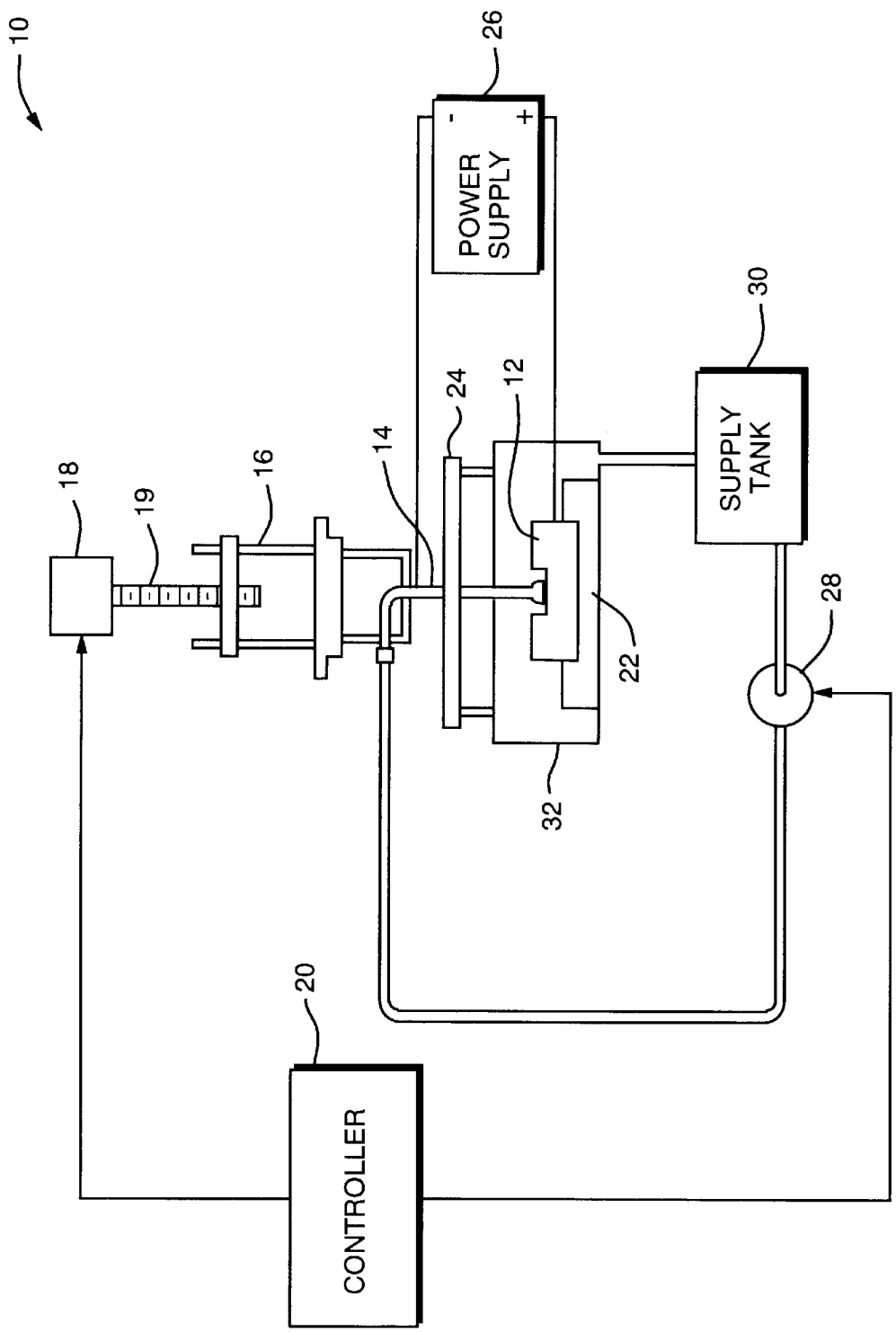
FIG. 1 is a schematic diagram of an electrochemical machining apparatus using the electrode of the present invention.

Referring to the drawings wherein identical reference numerals denote the same elements throughout the various views, FIG. 1 shows an electrochemical machining (ECM) apparatus 10 for STEM drilling holes into a conductive workpiece 12. The ECM apparatus 10 includes an externally insulated, hollow electrode 14 mounted to a conventional ram arrangement 16. A servomotor 18 is connected to the ram arrangement 16 by a screw 19 or similar motion device for advancing the electrode 14 into the workpiece 12 during a STEM drilling operation. The servomotor 18 is connected to a controller 20 which is programmed to control the advancement of the ram arrangement 16 and thereby the feed rate of the electrode 14. An encoder (not shown) is included for providing feedback to the controller 20 on the depth of the electrode 14 as it moves through the workpiece 12 to form the hole.

The workpiece 12 is mounted in a suitable fixture 22 to hold it in place during STEM drilling. A guide block 24 is positioned above the workpiece 12 to position and guide the electrode 14 with respect to the workpiece 12. A power supply 26 (typically a DC voltage source) is connected between the workpiece 12 and the electrode 14. Specifically, the negative terminal of the power supply 26 is connected to the electrode 14, and the positive terminal of the power supply 26 is connected to the workpiece 12. Thus, the electrode 14 will function as a cathode and the workpiece 12 will function as an anode.

An acidic electrolyte is pumped through the hollow electrode 14 and onto the surface of the workpiece 12 by a pump 28. The pump 28 is connected to an outlet of an electrolyte supply tank 30. After the electrolyte impacts the surface of workpiece 12, it will be forced by fresh electrolyte exiting the electrode 14 under pressure to flow up and out of the hole being formed in the workpiece 12 and then into a catch basin 32 situated under the workpiece fixture 22. The electrolyte carries away ionized metal removed from the workpiece 12. Electrolyte in the catch basin 32 drains back into the supply tank 30 to be re-circulated through the system. The controller 20 controls the pump 28 to provide the desired flow rate of electrolyte through the electrode 14. In addition, conventional pressure and flow control valves (not shown) can be provided between the pump 28 and the electrode 14 to control the pressure and flow rate of the electrolyte. While an exemplary ECM apparatus 10 has been described to illustrate how the electrode 14 functions, it should be understood that the electrode of the present invention is not limited to this particular apparatus and could also be used in other ECM configurations.

Figure 2:
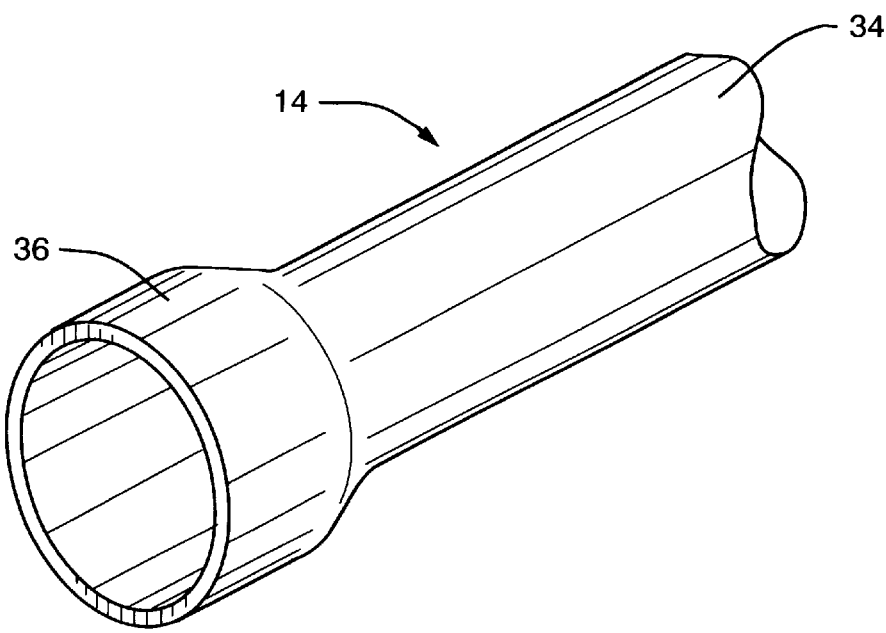
FIG. 2 is a partial perspective view of the electrode of FIG. 1.
Figure 3:
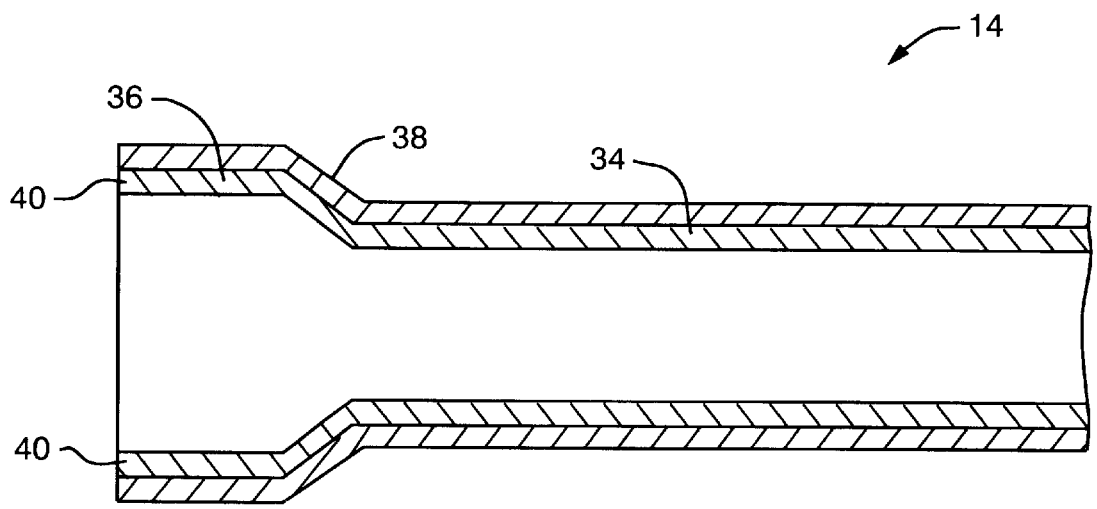
FIG. 3 is a partial, longitudinal sectional view of the electrode of FIG. 1.

FIGS. 2 and 3 show the electrode 14 in more detail. The electrode 14 is a two-part element comprising an elongate shank 34 and a tip section 36 disposed on one end of the shank 34. The tip section 36 is very small in length with respect to the shank 34 such that the shank 34 makes up a large majority of the overall length of the electrode 14. Preferably, the tip section length is less than about 0.25 inches (0.64 cm). The shank 34 is a hollow tube having a circular cross-section, while the tip section 36 is a hollow member having a non-circular cross-section. The tip section 36 is sized and shaped in accordance with the size and shape of the hole or passage desired to be formed in the workpiece 12. Generally, the cross-sectional area of the tip section 36 will be somewhat larger than the cross-sectional area of the shank 34. For example, FIGS. 2 and 3 show an oval or elliptic tip section 36 having a minor axis that is equal to (or even greater than) the diameter of the circular shank 34. It should be pointed out, however, that the tip section 36 of the present invention is not limited to elliptic cross-sections as other non-circular cross-sections can be used as well.

Both the shank 34 and the tip section 36 are made of an electrically conductive materially suitable for electrochemical machining, such as titanium. The electrode wall thickness is sufficient to conduct the required current for electrolytic action and to provide enough over-cut between the electrode 14 and the workpiece 12 to allow free passage of electrolyte out of the hole being formed. The shank 34 and the tip section 36 are coated on their outer surfaces with an insulating coating 38 to prevent contact with the metal workpiece 12. As is known in the art, the insulating coating 38 can be a dielectric material resistant to electrolytic action and the acidic electrolytes used in STEM drilling so as to limit electrolytic action to the desired machining area. The tip section 36 has an exposed cutting surface 40 formed on the distal edge thereof (i.e., the edge that is opposite the shank 34) for STEM drilling. The cutting surface 40, which takes on the cross-sectional shape of the tip section 36, defines the size and shape of the hole formed in the workpiece 12.

The electrode 14 can be constructed from a conventional circular tube on which the non-circular tip section 36 is integrally formed by manipulation of the tube end. For example, conventional tube end expanding and mold pressing operations such as flaring, bulging, grooving or flanging (supplemented with any needed cutting or trimming operations) can be used to shape an end of the circular tube to the desired size and cross-section geometry to define the tip section 36. Alternatively, the tip section 36 can be a separate member made in the desired shape and attached to an end of a conventional circular tube by a joining process such as laser welding, electron beam welding or brazing.

With this arrangement, the majority of the electrode 14 has a circular cross-section, but the electrode 14 is still capable of drilling the desired non-circular shaped holes by virtue of the shaped tip section 36. Since the majority of the electrode 14 is circular in cross-section, it is relatively easy to straighten the electrode 14 prior to a STEM drilling operation and to keep it straight during the operation. Also, because of its axisymmetric configuration, the shank 34 avoids electrolyte pressure imbalances, thereby further facilitating preservation of a straight electrode during drilling operations. The circular shank 34 also simplifies use of the guide block 24. Because the shank 34 is circular, a guide block having a circular opening can be used. This avoids the directional problems of trying to align an elliptic tube in an elliptic guide opening that would be encountered without the present invention. This design also eases the difficulty and high cost of making the electrode relative to full-length, non-circular electrodes because of the majority of the electrode 14 has a circular cross-section.

Optionally, to further mitigate electrolyte pressure imbalances, a lowered electrolyte inlet pressure may be used with an appropriately prolonged drilling pulse interval. That is, the inlet pressure of the electrolyte pumped through the hollow electrode 14 can be lowered by up to 60% with respect to the inlet pressure that would otherwise by used for the given conditions. The lowered inlet pressure will minimize tube bending that is caused by pressure imbalance, while the longer pulse interval will ensure that adequate electrolyte renewal in the machining zone is achieved despite the reduced pressure.

The foregoing has described an electrode that is capable of forming non-circular holes while overcoming the drawbacks of full-length, non-circular electrodes. While specific embodiments of the present invention have been described, it will be apparent to those skilled in the art that various modifications thereto can be made without departing from the spirit and scope of the invention as defined in the appended claims.

What is claimed is:

1. An electrode for use in an electrochemical machining apparatus, said electrode comprising:
    a shank having a circular cross-section; and
    a tip section having an elliptic cross-section defining major and minor axes disposed on one end of said shank, said tip section having an edge formed thereon opposite said shank, said edge defining a non-circular cutting surface for forming non-circular holes.

2. The electrode of claim 1 wherein both said shank and said tip section are hollow.

3. The electrode of claim 1 wherein said tip section is less than about 0.25 inches in length.

4. The electrode of claim 1 wherein said non-circular cutting surface is sized and shaped to define a desired size and shape of holes to be formed by said electrode.

5. The electrode of claim 1 wherein said shank defines a diameter and said minor axis is greater than or equal to said diameter.

6. The electrode of claim 1 wherein said tip section is integrally formed on one end of said shank.

7. The electrode of claim 1 wherein said tip section is attached to one end of said shank by a joining process.

8. An electrode for use in an electrochemical machining apparatus, said electrode comprising:

a hollow shank having a circular cross-section; and a hollow tip section having an elliptic cross-section defining major and minor axes disposed on one end of said shank, said tip section being smaller in length than said shank and having an edge formed thereon opposite said shank, said edge defining a non-circular cutting surface for forming non-circular holes.

9. The electrode of claim 8 wherein said tip section is less than about 0.25 inches in length.

10. The electrode of claim 8 wherein said non-circular cutting surface is sized and shaped to define a desired size and shape of holes to be formed by said electrode.

11. The electrode of claim 8 wherein said shank defines a diameter and said minor axis is greater than or equal to said diameter.

12. The electrode of claim 8 wherein said tip section is integrally formed on one end of said shank.

13. The electrode of claim 8 wherein said tip section is attached to one end of said shank by a joining process.

* * * * *